US005757386A

United States Patent [19]

Celi, Jr. et al.

[11] Patent Number: 5,757,386

[45] Date of Patent: May 26, 1998

[54] METHOD AND APPARATUS FOR VIRTUALIZING OFF-SCREEN MEMORY OF A GRAPHICS ENGINE

[75] Inventors: Joseph Celi, Jr., Boynton Beach; John P. Coffey, Boca Raton; Jonathan Mark Wagner, Coral Springs, all of Fla.

[73] Assignee: International Business Machines Corporation, Armonk, N.Y.

[21] Appl. No.: 514,214

[22] Filed: Aug. 11, 1995

[51] Int. Cl.[6] .................... G06F 15/167

[52] U.S. Cl. .................... 345/507; 345/512

[58] Field of Search .................... 395/507, 508, 395/509, 510, 511, 512; 345/189, 185, 501, 508, 510, 511, 512

[56] References Cited

U.S. PATENT DOCUMENTS

| | | | |
|---|---|---|---|
| 4,511,965 | 4/1985 | Rajaram | 364/200 |
| 4,606,066 | 8/1986 | Hata et al. | 382/41 |
| 4,656,596 | 4/1987 | Thaden et al. | 364/521 |
| 4,757,312 | 7/1988 | Asai et al. | 340/750 |
| 5,001,652 | 3/1991 | Thompson | 364/521 |
| 5,151,997 | 9/1992 | Bailey et al. | 395/800 |
| 5,218,670 | 6/1993 | Sodek, Jr. et al. | 395/115 |
| 5,245,702 | 9/1993 | McIntyre et al. | 395/507 |
| 5,250,940 | 10/1993 | Valentaten et al. | 345/189 |
| 5,291,188 | 3/1994 | McIntyre et al. | 345/189 |
| 5,388,207 | 2/1995 | Chia et al. | 395/507 |

*Primary Examiner*—Raymond J. Bayerl
*Assistant Examiner*—Cao H. Nguyen
*Attorney, Agent, or Firm*—Mark S. Walker; Alan L. Carlson; Andrew J. Dillon

[57] ABSTRACT

An application request for off-screen VRAM is satisfied transparently to the application by allocating off-screen VRAM, if available, or system RAM if off-screen VRAM is unavailable. In addition, a list is kept of previous memory requests so that requests which were satisfied by allocating system RAM can be switched to off-screen VRAM, if such off-screen VRAM should later become available. Allocation of off-screen VRAM is controlled by a device driver that responds to various application memory requests and controls the off-screen VRAM resources, among other things. The device driver receives an allocation request for off-screen VRAM and determines whether the request may be honored with available off-screen VRAM resources. If the request can be honored with available off-screen VRAM resources, the device driver allocates a portion of the available off-screen VRAM resources to honor the request and decreases the amount of available off-screen VRAM resources. If the request cannot be honored with available off-screen resources, the device driver allocates a portion of system RAM to honor the request. The device driver also receives and processes requests to deallocate, previously allocated, off-screen VRAM resources in order to increase the amount of available off-screen VRAM resources. As a result of the increased resources, the device driver may transfer a request that was previously honored with system RAM to the off-screen VRAM resources to honor that request with off-screen VRAM resources.

30 Claims, 7 Drawing Sheets

METHOD AND APPARATUS FOR VIRTUALIZING OFF-SCREEN MEMORY OF A GRAPHICS ENGINE

FIELD OF THE INVENTION

This invention relates to a method and apparatus for using a memory of a graphics engine and, more particularly, to a method and apparatus for virtualizing off-screen memory of a graphics engine.

BACKGROUND OF THE INVENTION

FIG. 1 illustrates the system architecture for a conventional computer system, such as an IBM PS/2® personal computer (PC). The exemplary computer system of FIG. 1 is for descriptive purposes only. Though the description below may refer to terms commonly used in describing particular computer systems, such as an IBM PS/2 PC, the description and concepts equally apply to other systems, including systems having architectures dissimilar to FIG. 1.

The exemplary computer 100 includes a central processing unit (CPU) 105, which may include a conventional microprocessor; a system random access memory (RAM) 110 for temporary storage of information and a read only memory (ROM) 1115 for permanent storage of information. A memory controller 120 is provided for controlling system RAM 110; a bus controller 125 is provided for controlling bus 130; and an interrupt controller 135 is used for receiving and processing various interrupt signals.

Mass storage may be provided by a diskette 142, a CD-ROM disk 147 or a hard disk 152. The diskette 142 can be inserted into a diskette drive 141, which is, in turn, connected to bus 130 by a controller 110. Similarly, the CD-ROM disk 147 can be inserted into a CD-ROM drive 146, which is also connected by a controller 145 to bus 130. Finally, hard disks 152 are part of a fixed disk drive 151, which is connected to bus 130 by controller 150.

Input and output to computer system 100 is provided by a number of devices. For example, a keyboard and mouse controller 155 connects to bus 130 for controlling a keyboard input device 156 and a mouse input device 157. A DMA controller 160 is provided for performing direct memory access to system RAM 110. A visual display is generated by a video controller 165, which controls a video output display 170. Display 170, under the control of the computer system 100, generates a two dimensional array of picture elements (pixels), which may be independently controlled to form an image. Other input and output devices, such as an audio subsystem 191, may be connected to the system through expansion slot 190.

The computer 100 is generally controlled and coordinated by operating system software, such as the OS/2® operating system, available from the International Business Machines Corporation (IBM), Boca Raton, Fla. Operating systems provide resource management throughout a computer system, including such tasks as process execution and scheduling memory management, file system services, networking and scheduling and I/O services, and user interface presentation. User applications, such as editors and spread sheets, directly or indirectly, rely on these and other capabilities of the operating system.

Computer systems are increasingly using sophisticated techniques to display information to a user. Modern computers use "graphics" capabilities to produce various graphical items, such as lines, boxes, and circles, on a display 170, typically in color. These graphics capabilities are used, for example, by GUIs and other computer applications.

In addition to graphics, modern computers are increasingly using multimedia techniques, which store, organize, and present various forms of data, including textual data, digital audio data, digital video data, and digital music data (e.g., MIDI). For example, a computer using multimedia techniques may play back video data and audio data to produce a movie clip video sequence on display 170 with synchronized audio output from audio subsystem 191.

Graphical displays and video images are conventionally produced by storing data for each pixel in a corresponding location of a so-called "frame buffer" 180. A typical frame buffer 180 is constructed from special memory chips called VRAMs, which allow conventional read and write operations to be performed to memory cells of the VRAM on one port, while allowing data to be scanned out from the cells via a second, scan port. The display controller 165 typically scans the data out and uses it to cause corresponding pixels of the display 170 to be energized in accordance with the display data.

The display data may indicate whether or not a pixel should be illuminated, or if color images are involved, may indicate the desired luminance and chrominance for a pixel. Moreover, color data may be implemented according to a variety of formats, such as YUV, RGB, RBG, etc., which require many bits of data per pixel. Modern color formats, for example, may require up to three bytes, or twenty four bits, of information per pixel.

Producing graphical and video images requires a substantial amount of system resources. Even relatively simple graphical items, such as lines and circles, may require considerable computation to determine which pixels should be illuminated. For example, the well known algebraic line equation, y=mx+b, is typically unsuitable for use as a graphics equation because it often yields a line having an appreciable "staircase effect." Consequently, over the years, mathematicians and designers have developed "graphics equations" peculiarly suited to the needs of a discrete, pixel-oriented display 170. Though these equations yield higher quality graphic items, they are computationally intensive.

Animated video may involve relatively less computation, but usually requires considerably more storage resources and system bus 130 bandwidth. Animated video is produced by displaying a sequence of video frames at a sufficient playback rate, such as fifteen video frames per second, to yield a relatively continuous image. Generally, the faster the playback, the better the video.

Because a typical a video frame may involve thousands to millions of pixels, the storage and bandwidth problems quickly become critical. To help alleviate the storage and bandwidth burdens, special video data formats and compression and decompression techniques have been developed. With such systems, compressed video data are retrieved into system RAM 110. There, the compressed data may be decompressed by a software decompression routine. Afterwards, the decompressed data are placed in frame buffer 180. In some cases, the decompressed data are "stretched" a predefined amount by a software stretch routine, for example, and the stretched image is placed in the frame buffer 180. Stretching techniques allow a smaller image to be stored and retrieved and a larger image to be displayed.

IBM Corp. has developed the Ultimotion™ technology, which, among other things, provides software routines to compress and decompress frames of video data in the Ultimotion color format. Each video frame may be either an "intra" frame or a "delta" frame: an intra frame is representative of the entire image to be displayed; and a delta frame is representative of changes to a prior image frame. Though Ultimotion and other systems have alleviated the burdens incurred in producing animated video, a substantial amount of resources are still required.

In addition, considerable effort has been made in developing graphic engines 175 to further alleviate the burden placed on CPU 155 and system bus 130 in producing graphics and animation. There are a wide variety of graphic engines on the market, each having a particular set of capabilities. Typically, a graphic engine 175 includes its own internal memory and special purpose hardware to determine which pixels should be energized in response to a graphics command and to store the appropriate display data in a proximal frame buffer 180. For example, a conventional engine 175 may have special hardware to implement a graphics line equation to determine which pixels should be energized to display a line, in response to a command to draw a line. Conventional engines 175 typically further include functionality to draw circles and rectangles, as well as having the capability to fill areas with color and "clip" images. Besides freeing the CPU 155 from having to perform the computational operations involved with the graphics equations, engine 175 frees the system bus 130 from having to transfer the considerable amount of display data to the frame buffer 180.

The amount of memory required for a frame buffer 180 depends upon the number of pixels of the display 170 and the amount of data required for each pixel. Often, a graphics engine provides more memory capacity in its internal memory than is needed for the frame buffer 180. Though this "extra" memory capacity may be implemented in VRAM, DRAM, SRAM, or other memory technology, the extra capacity is typically, collectively called "off-screen VRAM."

Off-screen VRAM 185, like the frame buffer 180, is proximal to graphics engine 175. Consequently, the engine 175 may access data more efficiently in off-screen VRAM 185 than data in system RAM 110, because the engine 175 does not incur the performance penalty associated with using bus 130 to retrieve data. This aspect is often exploited to improve performance by a technique called "caching." The more often particular data are used by engine 175, the greater the performance advantage of caching, or storing, that data in off-screen VRAM 185. Typically, mouse cursor information or font information is cached. Newer techniques, discussed in the detailed description, also exploit the performance advantage associated with off-screen VRAM 185.

Although off-screen VRAM may be used to improve performance, the prior art mechanisms for utilizing off-screen VRAM 185 are less than desirable. Conventionally, when software requests off-screen VRAM resources, the requesting software must use system RAM 110 to hold the data, if the off-screen VRAM resources are insufficient to honor the request. This adds complexity to the software because it must decide whether sufficient capacity is available in the off-screen VRAM and use system RAM if sufficient capacity is unavailable. Moreover, off-screen VRAM resources 185 may be unavailable, when initially requested, but may later become available, when the requesting software is still using the memory. In such a circumstance, the static conventional memory allocation mechanisms fail to switch to the more efficient off-screen resources as they become available. Instead, the requesting software continues to use the less efficient system RAM 110, even if the off-screen VRAM 185 has since become available. Thus, the off-screen resources are not exploited to the fullest extent.

Accordingly, there is a need in the art for a method and apparatus to efficiently and conveniently use off-screen VRAM.

The present invention provides a method and apparatus that allows off-screen VRAM resources to be controlled dynamically so that they may be utilized efficiently.

An advantage of the invention is the ability to control both off-screen VRAM and system RAM transparently so that applications perceive a single VRAM that is larger than off-screen VRAM.

A further advantage of the invention is the ability to control both off-screen VRAM and system RAM so that a request for off-screen VRAM resources, which must be initially satisfied by system RAM, may be serviced by off-screen VRAM resources which later become available.

SUMMARY OF THE INVENTION

The present invention relates to a method and apparatus which receives an application request for off-screen VRAM and satisfies this request transparently to the application by allocating off-screen VRAM, if available, or system RAM if off-screen VRAM is unavailable. In addition, a list is kept of previous memory requests so that requests which were satisfied by allocating system RAM can be switched to off-screen VRAM, if such off-screen VRAM should later become available.

In particular, the inventive apparatus comprises a device driver that responds to various application memory requests and controls the off-screen VRAM resources, among other things. The device driver receives an allocation request for off-screen VRAM and determines whether the request may be honored with available off-screen VRAM resources. If the request can be honored with available off-screen VRAM resources, the device driver allocates a portion of the available off-screen VRAM resources to honor the request and decreases the amount of available off-screen VRAM resources. If the request cannot be honored with available off-screen resources, the device driver allocates a portion of system RAM to honor the request.

The device driver also receives and processes requests to deallocatė, previously allocated, off-screen VRAM resources in order to increase the amount of available off-screen VRAM resources. As a result of the increased resources, the device driver may transfer a request that was previously honored with system RAM to the off-screen VRAM resources.

Thus, the application sees a "virtual" off-screen VRAM that appears much larger than the actual off-screen VRAM. More particularly, the off-screen VRAM resources appear to be as large as the combination of the actual off-screen VRAM and the allocable portion of the system RAM. Consequently, the requesting is not involved with the additional complexity of allocating and managing system RAM, if the actual off-screen VRAM has insufficient available resources to honor the request.

BRIEF DESCRIPTION OF THE DRAWING(S)

The above and further advantages of the invention may be better understood by referring to the following description in conjunction with the accompanying drawings in which.

DETAILED DESCRIPTION

Figure 2:
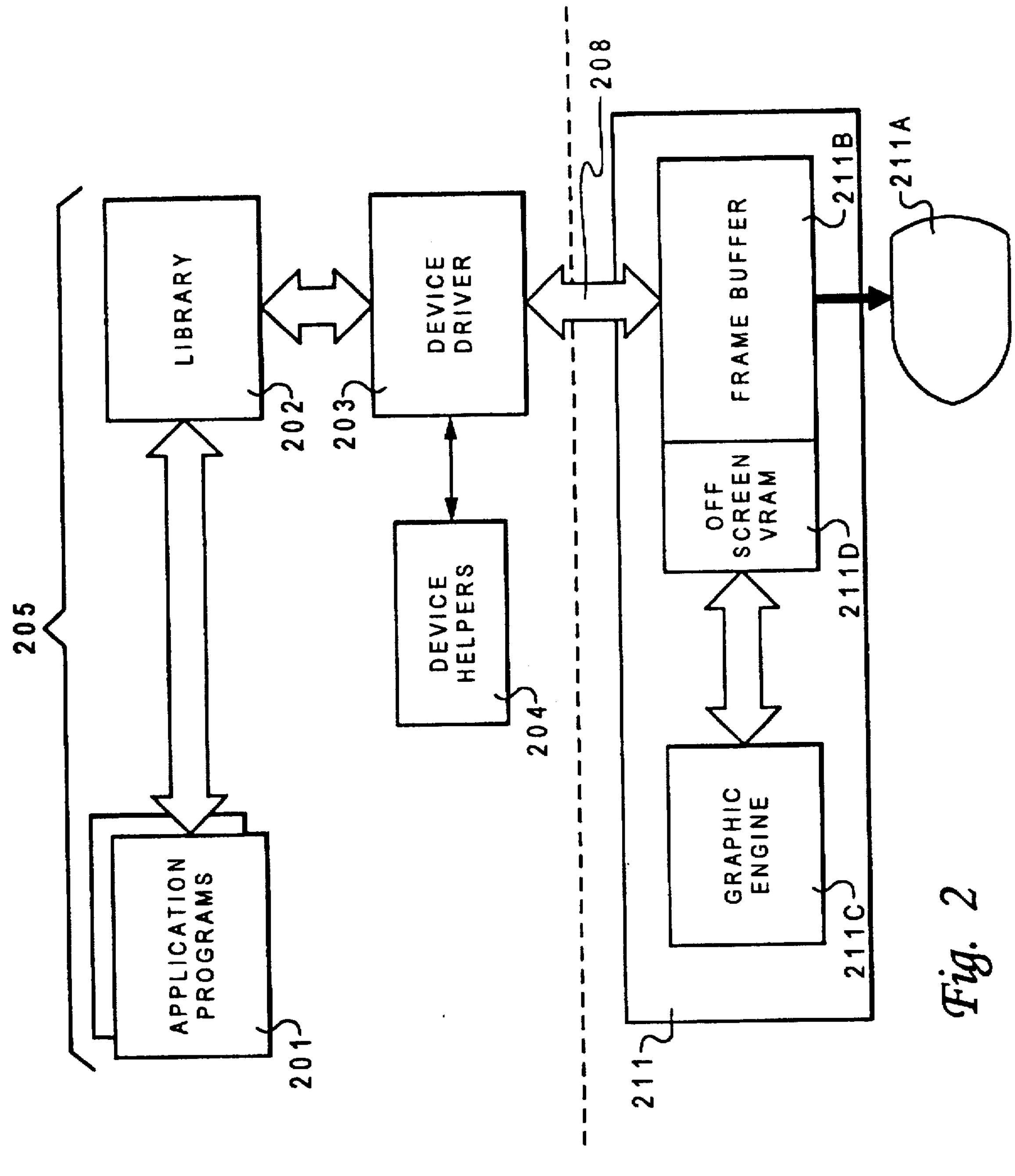
FIG. 2 is a simplified schematic block diagram which illustrates the architecture of an illustrative embodiment of the invention.

FIG. 2 illustrates an illustrative embodiment of the invention. More particularly, application programs 201, which may include GUI and multimedia applications, invoke various software routines of a software library 202. The routines of library 202, in turn, communicate with a device driver 203. Device driver 203 is hardware specific software that is responsible for communicating with display controller 211. Controller 211 includes a graphic engine 211 C, off-screen VRAM 211D, and a frame buffer, or on-screen VRAM, 211B. As discussed above, the frame buffer 211B is scanned by the controller 211 to provide an image on display 211A.

Figure 1:
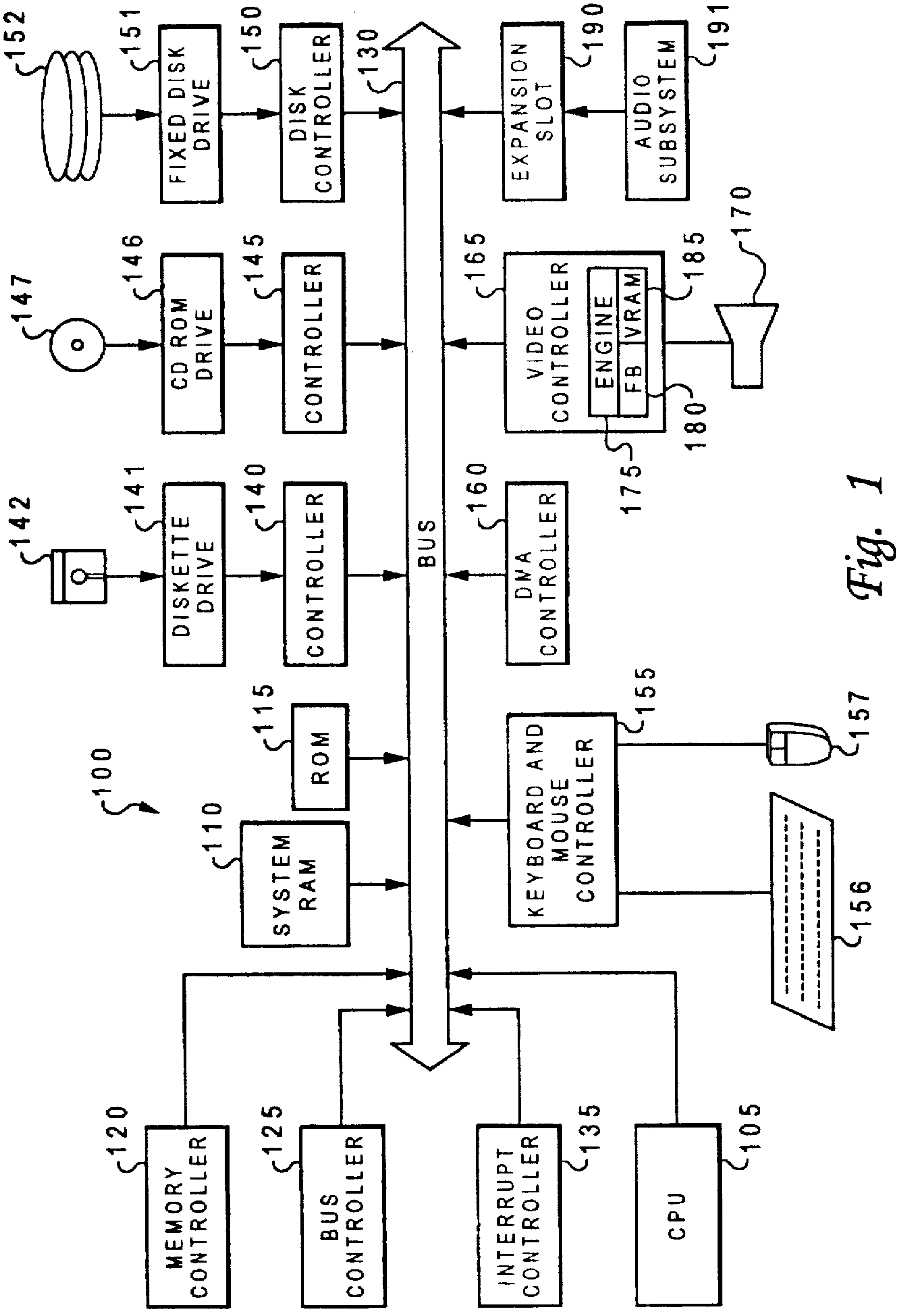
Fig. 1 Prior Art
FIG. 1 is a schematic block diagram of a conventional computer system.

The various software components 201–203 are executed by CPU 105 (see FIG. 1), under the control of an operating system. When executing, each software component resides in system RAM 110 (see FIG. 1). When the CPU 105 executes routines in the device driver 203, various commands and data are caused to be transmitted across system bus 130 to controller 211. Depending upon whether the controller 211 is I/O mapped, memory mapped, or a hybrid type, the controller 211 may need to access RAM 110, via bus 130, to receive the complete command.

Software library 202 typically includes routines that are commonly needed by applications 201. As such, application development is facilitated, because an application developer need not design, develop, test, and debug code that is commonly needed, such as decompression routines, color conversion routines, software implementations of graphics equations, and the like.

Typically, modern applications invoke graphics and animation capabilities at a fairly high level of functional abstraction. For example, an application that implements animated video may have commands akin to "create video stream," "play video stream," and "pause video stream." The underlying mechanics of opening the appropriate data files, synchronizing the video frames, decompressing compressed video data, converting the data to a different color format, if necessary, and otherwise handling the functions inherent in the application's commands are left to other software, notably the operating system in conjunction with the routines in library 202.

If necessary, applications 201 need not use library 202, but instead may directly communicate with the device driver 203, if the applications 201 have the appropriate system privileges. To better focus the remaining description on the various aspects of the invention, the combination of the applications 201 and the library 202 will hereinafter be referred to as "requesting software" 205.

The device driver 203 includes a set of entry points, or "exports," at which the device driver 203 may be invoked, or called. Each entry point has an associated software routine that corresponds to a particular function performed by the device driver 203. For example, device driver 203 includes an entry point dedicated to allocating and deallocating buffers in off-screen VRAM. Each routine associated with an entry point expects to receive certain "in parameters" as part of the call; likewise, the calling code, e.g., the requesting software 205, expects to receive certain "out parameters" from the routine, as well as return codes according to a predefined interface. The return codes may indicate that an error was encountered, that the request was successfully serviced, or that the requested was partially serviced.

Device driver 203 may use known device "helper" routines 204 in order to perform its tasks. Helper routines 204 are typically routines used by device drivers and are provided by many operating systems, including the OS/2 operating system, to facilitate the development of device drivers. In this respect, helper routines 204 are somewhat analogous to the library 202 discussed above.

In an illustrative embodiment, the requesting software 205 queries the device driver 203 to determine the capabilities offered by the associated controller 211. These queries may be performed when the requesting software 205 is performing initialization, for example. The requesting software 205 may then set corresponding software flags so that the software 205 knows in the future what actions it may take and so that it may control its requests accordingly. For example, if the graphic engine 211C includes hardware support for stretching video images, the software 205 sets a flag after receiving a response to its query request. The software 205 may later "branch" on this flag to either invoke the appropriate instructions to controller 211 to use the stretching hardware or to invoke a less efficient software stretching routine.

In an illustrative embodiment, the requesting software 205 initially registers itself with the device driver 203 by calling a registration entry point of the device driver 203. A registration routine of device driver 203 provides a "requester handle" that uniquely identifies the requesting software 205. Among other things, the requester handle may be helpful for certain types of buffer management, which require integrity. In addition, registration allows multiple applications 201 to concurrently use VRAM resources, for example, to play multiple movie sessions.

Software 205 requests a buffer memory, or a contiguous portion of off-screen VRAM 211D, by calling a buffer allocation/deallocation entry point of device driver 203. The "in parameters" for this entry point include a function code indicating whether a buffer is being requested or deallocated, the desired size of the buffer, a buffer id, the requester handle, and the type of buffer desired. The "out parameters" from the routine include the size of the allocation actually performed and a VRAM address.

The buffer allocation call may be made during initialization of one of application programs 201, for example. As suggested above, the buffer, once allocated, may be used by the requesting software 205 to improve performance by caching cursor information, or storing decompressed, but unstretched, video data, for example.

In general, the operation of off-screen VRAM 211D is as follows. Briefly, during times of low demand, requests for off-screen VRAM are serviced by allocating a buffer in actual off-screen VRAM 211D. U.S. Patent Application entitled DYNAMIC OFF-SCREEN DISPLAY MEMORY MANAGER, by Joseph Celi, Jonathan M. Wagner and Roger Louie, filed on an even date herewith, which application is commonly assigned to IBM, describes a method and apparatus for allocating and deallocating the actual off-screen VRAM 211D. The contents of that application are hereby incorporated by reference and outlined below to the extent they are material to understanding the present invention. Other allocation methods and apparatuses may be used to control the actual off-screen VRAM 211D without compromising the applicability of the present invention.

During times of high demand, the actual off-screen VRAM 211D may be too small to handle all requests. The present invention allocates memory from system RAM 106 to service the request and then monitors the actual usage of off-screen VRAM 211D so that request may eventually be transparently migrated to the more efficient actual off-screen VRAM 211D, if capacity becomes available.

Figure 3:
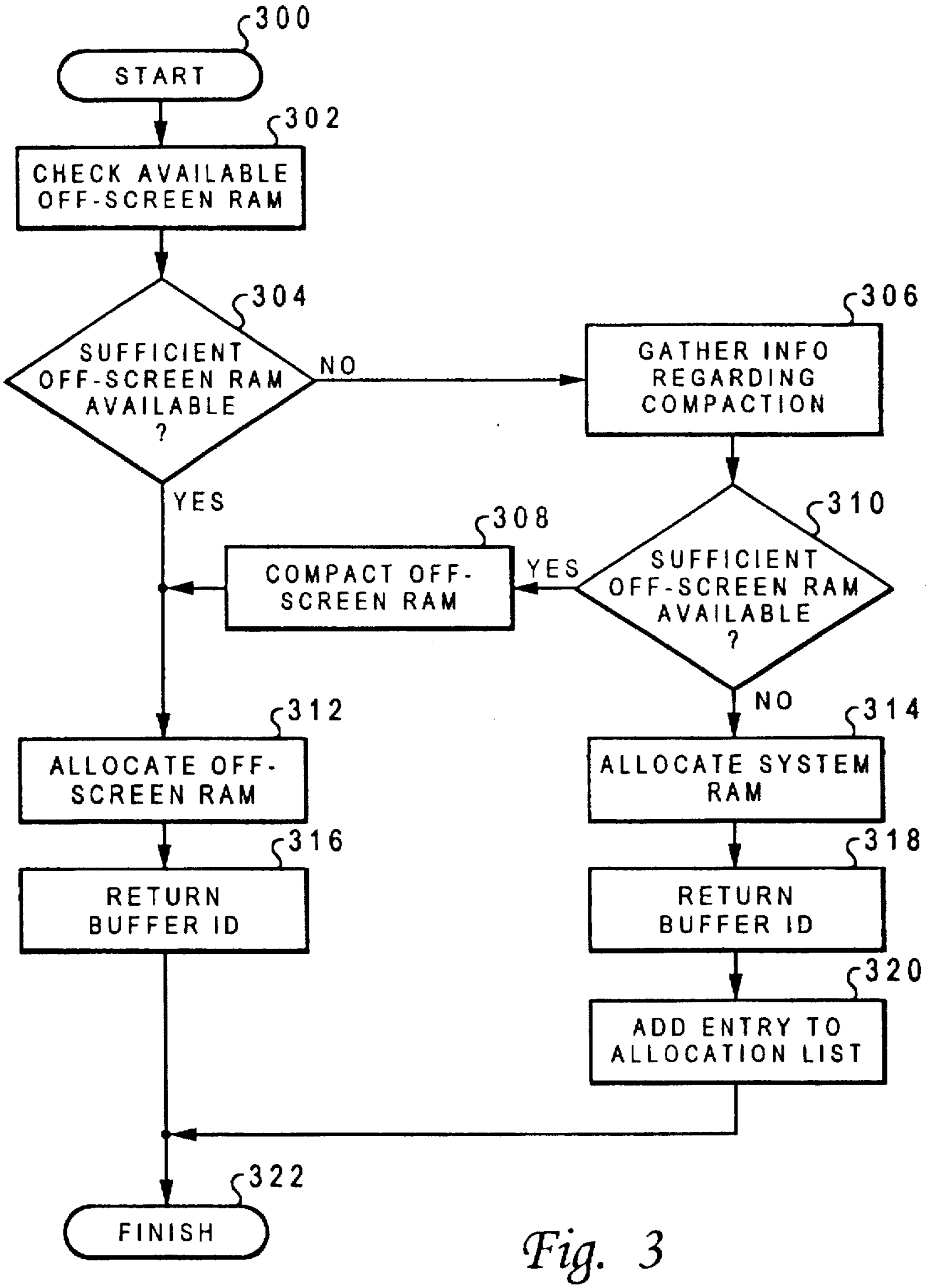
FIG. 3 is an illustrative flowchart disclosing a routine which allocates a virtual off-screen VRAM buffer according to an illustrative embodiment.

More particularly, FIG. 3 illustrates the steps involved in the allocation/deallocation routine, when a buffer allocation is requested. The routine begins in step 300 and proceeds to step 302. In step 302, the device driver 203 determines the availability of off-screen RAM to determine whether the request may be honored with actual off-screen VRAM 111D resources. In an illustrative embodiment, the routine performs this step by employing a "best fit" approach. The device driver 203 includes a VRAM allocation list implemented as a linked list data structure (the linked list structure is discussed in the aforementioned U.S. Patent application) to manage and maintain the actual off-screen VRAM 211D. Each item of the VRAM allocation linked list represents a section of the memory and stores, among other things, a "buffer id" for the associated off-screen buffer, the buffer size, whether the buffer has been used, and the buffer type.

In the illustrative embodiment, the buffers may be classified as either a "private" or "shared" type. Private buffers are accessible only to the requesting software 205 that originally allocated the buffer. Shared buffers, on the other hand, may be utilized by any requesting software 205. Such classification can be exploited in animation applications, for example, by using private buffers for delta frames and shared buffers for intra frames.

In order to determine if a large enough unused and contiguous section of actual off-screen VRAM 211D is available to honor the request, the device driver 203 traverses the VRAM linked list. Based on this traversal, in step 304, a determination is made whether there is sufficient off-screen RAM to satisfy the request. If there is such a section, the routine proceeds to step 312. In step 312, the device driver 203 modifies the VRAM linked list data structure to allocate the requested buffer (e.g., by inserting a new entry into the list specifying a new requester handle, a flag indicating that buffer has not been used, the size allocated, buffer id, etc.).

Further, in step 316, the device driver 203 modifies the out parameters to be returned by the allocation call to indicate the buffer id and the allocated VRAM address. In addition, the size of the allocation is provided. As such, the requesting software 205 may subsequently use the buffer by using the VRAM address and buffer id (for example, for subsequent deallocation requests). The routine then finishes in step 322.

If it is determined that a large enough contiguous section does not presently exist, then, in step 306, the routine gathers information as to whether the request could be honored if the unallocated space in the off-screen VRAM 211D were more efficiently consolidated. For example, there may be sufficient space in off-screen VRAM 211D, but the space may be fragmented into pieces, each of which is too small to honor the request. In step 310, the routine determines whether the request may be honored if the current allocation of buffers is compacted. If it can, the routine compacts the off-screen VRAM 211D in step 308 in order to reduce fragmentation, which may have occurred through servicing the prior allocation and deallocation requests. The routine then allocates the off-screen RAM and returns the appropriate parameters as discussed in connection with steps 312 and 316 above and finishes in step 322.

The methods and apparatuses of an illustrative embodiment for performing steps 302–306 and 308 are more particularly described in the aforementioned U.S. patent application; other methods and apparatuses may also be used to allocate the actual off-screen VRAM 211D without departing from the spirit and scope of the present invention.

If, as determined in step 310 after compaction, the request still cannot be honored, then in step 314 the routine allocates a buffer from the system RAM 106 and returns to the calling code the system address for the buffer. In one illustrative embodiment, the device driver 203 uses a known device driver "helper routine" 204 to allocate a buffer from system RAM 106. Other conventional techniques may be used to allocate a buffer in system RAM 106.

In addition, in step 318, the device driver 203 modifies the out parameter that indicates the amount of allocated space so that the out parameter indicates the amount of space potentially available in off-screen VRAM 211D. This out parameter is then returned to the requesting software 205 so that it may exploit this information. More particularly, requesting software 205 may desire an off-screen VRAM buffer of a certain size, but may still benefit from partitioning its needs such that some of its needs are satisfied by a smaller sized buffer. If this is the case, the requesting software 205 may decide to re-request a smaller sized buffer to satisfy some of its needs.

Figure 5:
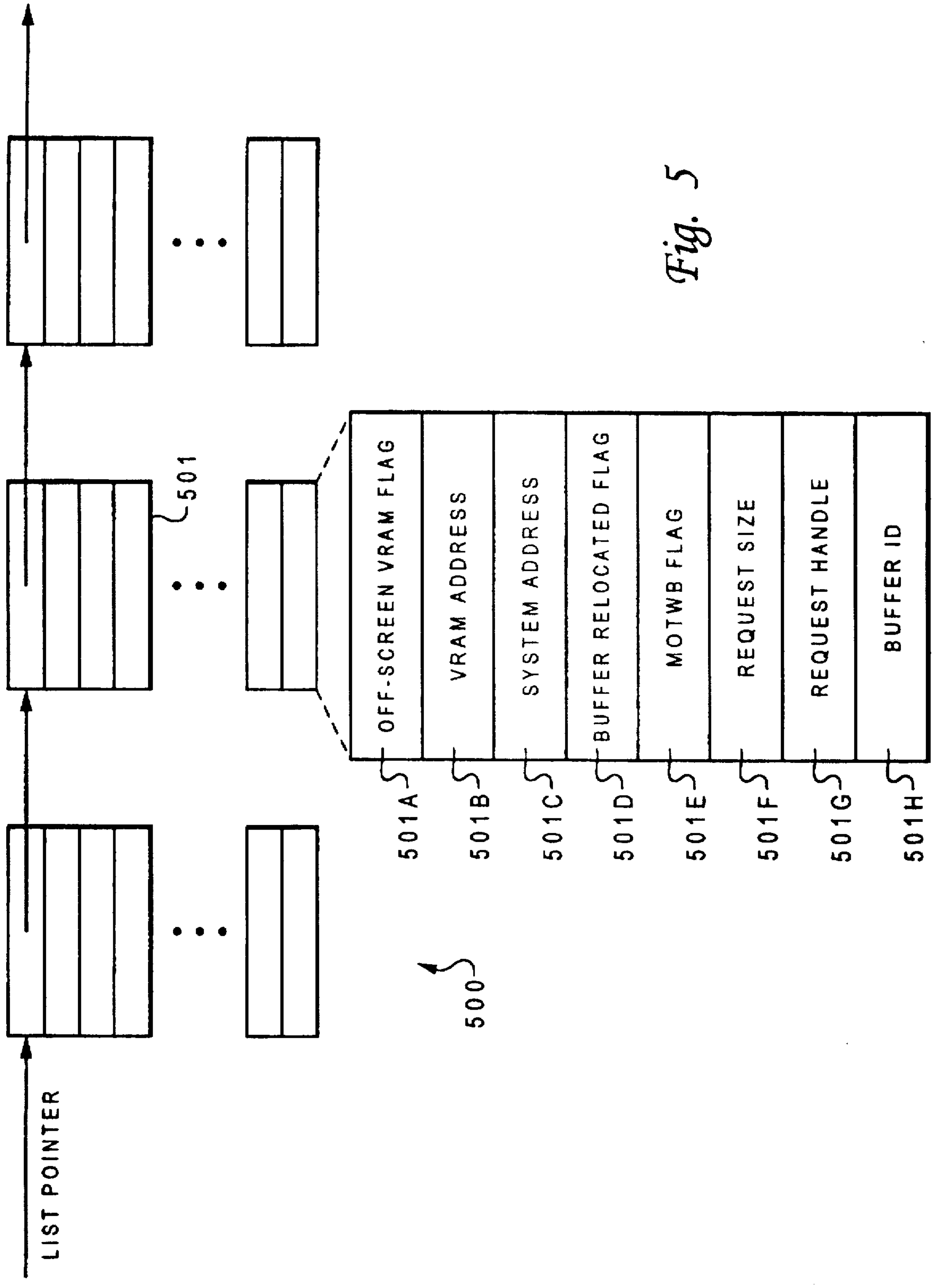
FIG. 5 is a schematic diagram illustrating a linked list data structure which stores buffer request information according to an illustrative embodiment.

Upon allocating a buffer in system RAM 106, in step 320, the device driver 203 sets flags in a second linked list 500 (see FIG. 5) for storing buffer request information. This buffer request list may be arranged according to the arrival order, for example, and is linked together by list pointers. Among other things, each element 501 of the list 500 includes a flag 501A indicating whether the request was serviced by using off-screen VRAM 211D or whether it was serviced by allocating buffer space in system RAM 106. In case the request was serviced with actual off-screen VRAM 211D, the linked list element 501 includes the VRAM address 501B; if the request was serviced in system RAM 106, the linked list element 501 includes the system address 501C. Each element 501 also indicates a flag 501D which indicates whether the buffer has been relocated (e.g., from system RAM to off-screen VRAM, as will be discussed below) since its last access.

The linked list entry also includes a "mark-on-the-wall-bit" ("MOTWB") 501E which, as will be explained in detail below, is used to indicate whether the corresponding request which has been serviced by allocating system RAM is a candidate for transfer into off-screen VRAM. Further entries are provided in the list entry 501 for storing the request size (501F), the request handle (501G) and the buffer id (501H).

Figure 4:
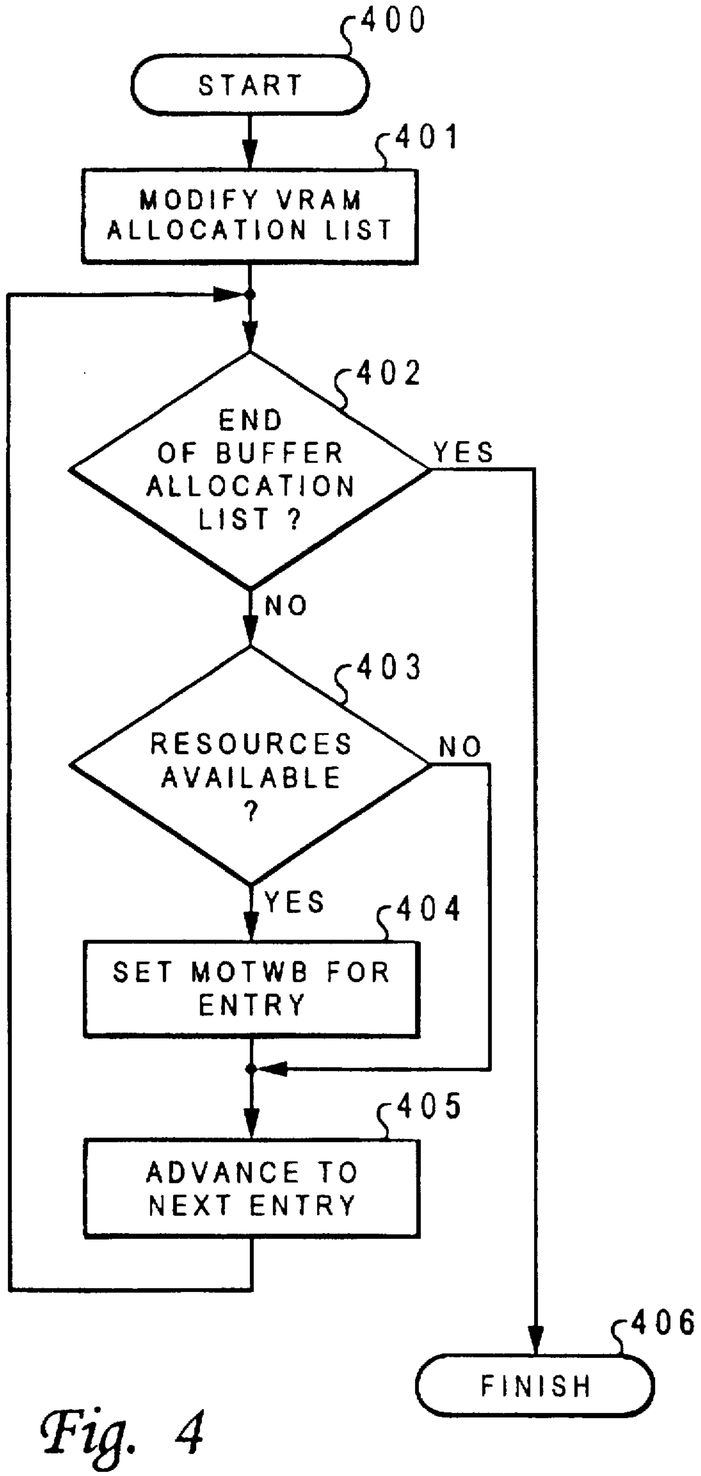
FIG. 4 is an illustrative flowchart disclosing a routine which deallocates a virtual off-screen VRAM buffer according to an illustrative embodiment.

FIG. 4 illustrates the steps involved in deallocating a buffer according to an illustrative embodiment of the invention. These steps are performed by the allocation/ deallocation entry point routine when the in parameters indicate that a deallocation is desired. For example, when one of applications 201, which previously successfully allocated a buffer from the actual off-screen VRAM 211D, terminates, it no longer needs its buffer and will call this entry point routine prior to termination in order to deallocate its buffer.

The routine begins in step 400 and proceeds to step 401. In step 401, the device driver 203 examines the VRAM allocation linked list used for monitoring allocation of the actual off-screen VRAM 211D. When the particular entry associated with the handle and buffer id of the request and the requesting software 205 is located, the entry is modified and the arrangement of the list is possibly modified. More particularly, the located entry is modified to indicate that the buffer is "deallocated" and is no longer in use. The arrangement of the first list may also be modified to insure more efficient use of the memory. For example, when a buffer is deallocated, if there is an adjacent unused buffer in off-screen VRAM 211D, the deallocation routine creates and inserts a new entry at the correct point in the VRAM allocation list so as to merge the two unused buffers into a single larger buffer.

In step 402, the routine traverses the buffer allocation list 500 beginning at the first entry and continuing until all entries have been traversed. If, as determined in step 402, the end of the list has been reached, the routine finishes in step 406. If the end of the list 500 has not been reached as determined in step 402, the routine sequentially analyzes each entry, which as previously mentioned corresponds to a previous request that was serviced by allocating system RAM.

In step 403, the routine determines whether the size of the associated request (stored in the entry, for example, 501F in FIG. 5), which is currently being serviced by the RAM 106, is less than the unallocated buffer space currently available in off-screen VRAM 211D as a result of the recent deallocation. If so, in step 404, the routine sets the "mark-on-the-wall-bit" ("MOTWB") 501E for the entry, indicating that the entry is a candidate for transfer to the off-screen VRAM.

Next, in step 405, the routine modifies the list pointer to point to the next entry of the buffer allocation list 500 and returns to step 402 to test whether the end of the buffer allocation list 500 has been reached. Consequently, at the end of the deallocation routine the previously allocated buffer will have been deallocated and each entry in the buffer allocation list which is a candidate for transfer into the enlarged unallocated VRAM space will have its MOTWB flag bit set.

Before the requesting software 205 uses a previously-allocated buffer—for example to place a decompressed, but unstretched, image in the buffer—the software 205 first accesses an informational entry point of device driver 203 to obtain information concerning the buffer. The informational routine expects certain in parameters, including the request handle and buffer id. In turn, the routine generates certain out parameters, including the VRAM 211D address, if appropriate, or the system RAM 106 address, if appropriate. It also returns an indication of whether the buffer has been relocated. The requesting software 205 receives this information and then uses the appropriate address to perform a subsequent operation. For example, if the requesting software 205 intends to perform a block transfer operation, or "BLT," the requesting software 205 will invoke the appropriate library routine 202 or hardware support registers of graphic engine 211C using the address returned by the informational entry point routine.

This informational entry point routine also allows software 205 to properly track if buffers have been relocated by the device driver 203. As suggested above, a buffer may be relocated as part of the compacting step 308 (FIG. 3). Likewise, as will be discussed below, a buffer that was previously allocated to system RAM 106 may be relocated to off-screen VRAM 211D.

According to one embodiment of the invention, every request that was serviced by allocating system RAM 106 in step 314 is automatically slotted as a candidate for subsequent transfer to off-screen VRAM resources 211D when these become available. Alternative embodiments are contemplated in which a request for off-screen VRAM resources 211D includes priority information. In this fashion, requesting software 205 may indicate, in effect, that it desires off-screen VRAM 211D, but, if the system is experiencing heavy demand, the software 205 is willing to concede the resources when they become available to a more urgent application.

Figure 6:
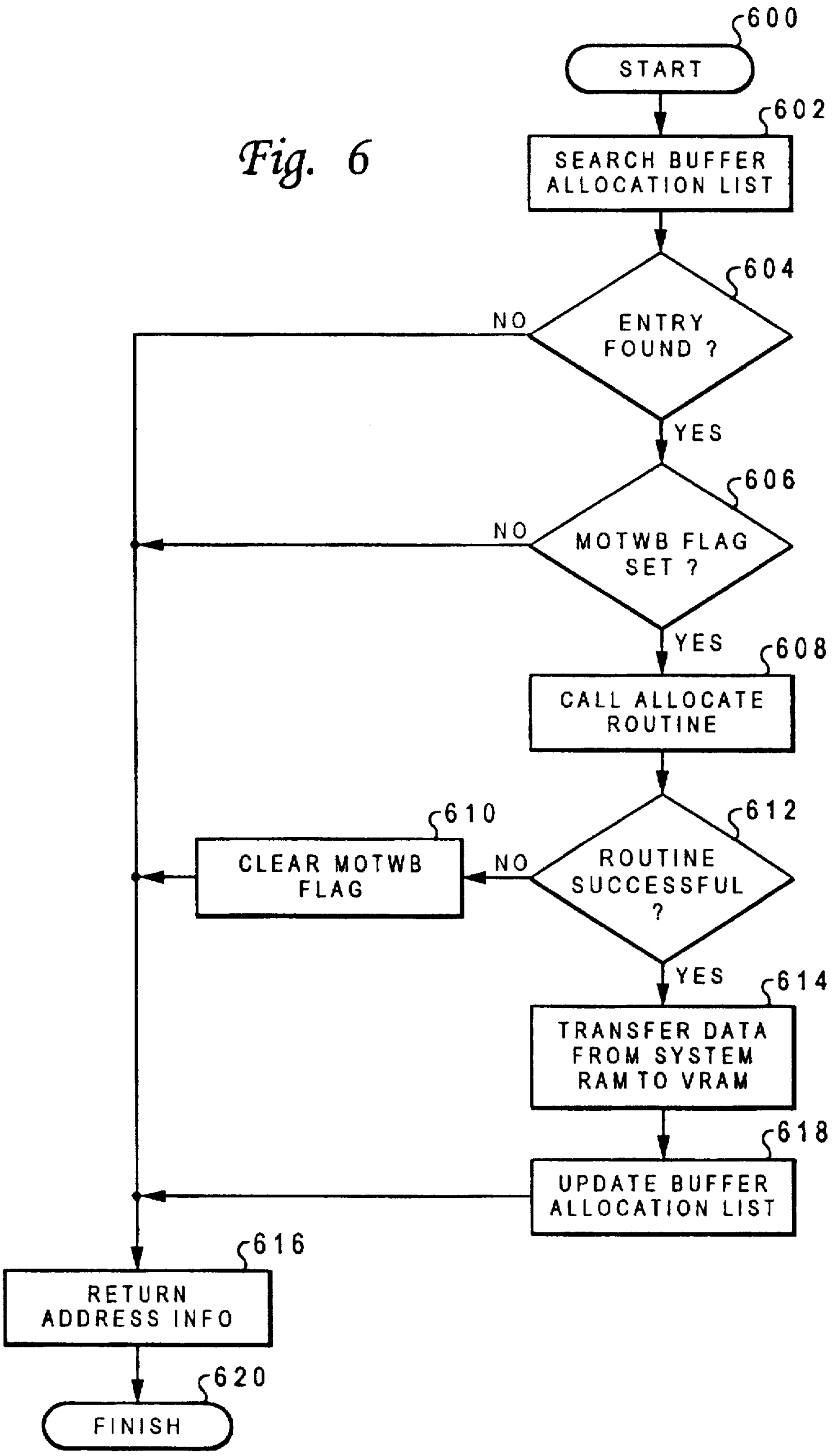
FIG. 6 is an illustrative flowchart which discloses a routine which returns buffer allocation information to requesting software according to an illustrative embodiment.

FIG. 6 more particularly shows the steps involved in the routine associated with the informational entry point. When the software 205 calls the informational entry point to locate a previously allocated buffer, the routine begins in step 600. In step 602, the routine searches the buffer allocation list to find the associated entry of list 500 by finding a request handle 501G and buffer id 501H that match the handle of the requesting software and the buffer id of the previously allocated buffer, respectively.

In step 604, a check is made at each entry to determine if the entry sought has been found. If the entry is not found in the buffer allocation list 500, the request was originally serviced in off-screen VRAM 211D, and the routine returns the VRAM address, etc., as discussed above, in step 616 and finishes in step 620.

Alternatively, if an entry is found corresponding to the buffer in step 604, the request was originally serviced in system RAM. Then, in step 606, the routine tests whether the found entry has its MOTWB flag bit 501E set indicating that the corresponding buffer is a candidate for transfer to off-screen VRAM.

If, in step 606, it is determined that the MOTWB flag bit is not set, the buffer cannot be transferred to the off-screen VRAM and the routine returns the usual information, e.g., system address and the like, in step 616 and finishes in step 620.

Alternatively, if it determined in step 606 that the MOTWB flag bit 501E is set, the deallocation routine (described above) has previously indicated that the corresponding buffer may possibly be migrated to actual off-screen VRAM 211D. However, there is no guaranty that the off-screen VRAM 211D resources are still available after the prior deallocation routine releases VRAM resources. For example, as previously described, the deallocation routine marks all candidates for transfer and another one of applications 201 may have been scheduled by the operating system for processing before the current application was scheduled. In this case, it is possible that the intervening application allocated enough of the off-screen VRAM previously available space so that the current request can no longer be honored.

If, in step 606, the MOTWB flag bit is set, the routine associated with the informational entry point then calls the allocation routine, discussed above, in step 608. In step 612, a check is made to determine whether the allocation routine succeeded. If the allocation request is unsuccessful, for example, if an intervening application has already allocated the resources, the routine clears the MOTWB flag bit 501E for that entry in step 610 and returns the usual information regarding the system RAM allocation to the requesting software 205 in step 616. Thus, the requesting software 205 continues to access the buffer allocated in RAM 106.

If step 612 indicates that the allocation is successful, in step 614, the routine transfers the data stored in system RAM 106 to the newly-allocated buffer in off-screen VRAM 211D, at the VRAM address returned from the allocation routine.

In step 618, the routine then updates the buffer allocation linked list 500 accordingly. This update includes a modification of the VRAM address to indicate the new VRAM location and a setting of the relocation flag to indicate that the buffered information has been relocated to the off-screen VRAM.

The routine then proceeds to step 616 and provides the usual information to the requesting software 205. The software 205 uses the new address, because it detects that the buffer has been relocated, and accesses the buffer in off-screen VRAM 211D. Consequently, the data is transferred to the more efficient off-screen VRAM 211D transparently to the user.

In an illustrative embodiment, the buffer transfer performed in step 614, like most other accesses to the off-screen VRAM 211D, is forced to be atomic by the use of a global semaphore covering the use of the off-screen VRAM 211D. The use of such semaphores to control access of data to assure coherency of the data, for example, is generally known in the art. In the instant invention, semaphores are used to ensure that BLTs, decompressions, color conversions, and the like may continue to completion before another software 205 may gain control of the off-screen VRAM 211D. Techniques using multiple semaphore may also be employed to "lock" portions of off-screen VRAM 211D, without locking the whole off-screen VRAM 211D.

Those skilled in the art will appreciate that the routines described above transfer requests serviced by system RAM 110 to off-screen VRAM 211D on a next-scheduled-application-best-fit basis. That is, the operating system controls the scheduling order of applications 201. Because several applications may have their requests serviced by RAM 106 and because the deallocation code marks the MOTWB flag bit 501E of all potential requests that may be satisfied, the priority of using the newly deallocated resources depends upon the scheduling order of the operating system and upon which requests have their MOTWB flag bit set. More than one request may possibly be serviced from a single deallocation, depending upon the size of the pending requests and the size of the newly deallocated resources.

Figure 7:
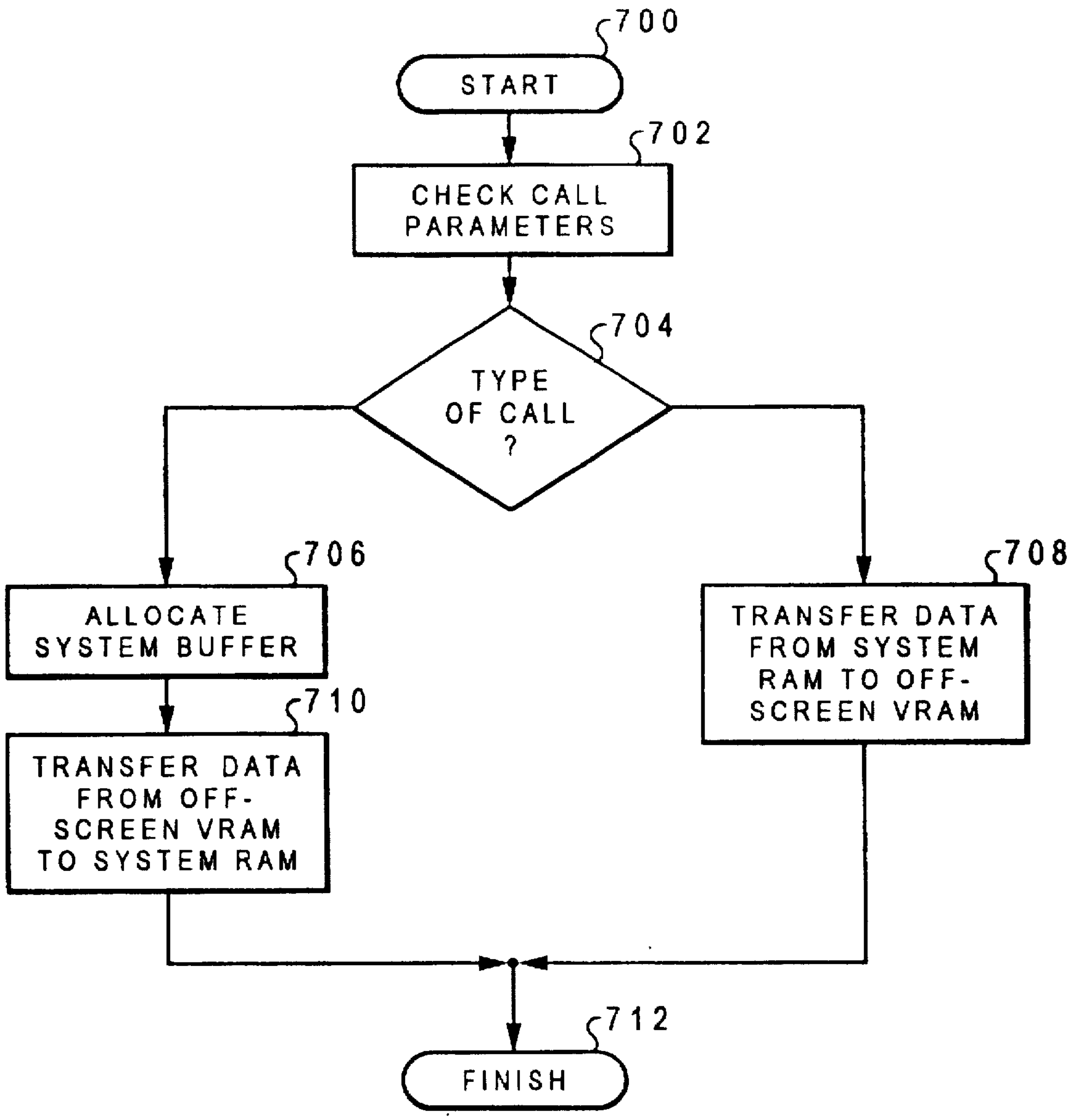
FIG. 7 is an illustrative flowchart which discloses a routine for clearing the entire contents of off-screen VRAM according to an illustrative embodiment.

Different techniques may also be incorporated. For example, a pure first-come-first-served algorithm may be employed by time stamping the buffer allocation list entries and marking the MOTWB flag bit 501E only on the "oldest" entry of list 500. It is also contemplated that the invention may be implemented by merging the VRAM allocation list and buffer allocation list 500 discussed above into a single "super" list. In this fashion, each entry would have the union of the information currently used in each entry of the two lists. In addition, all requests would be entered in the "super" list. When a buffer is deallocated it is then removed from the "super" list. In certain instances, it is desirable to gain control of the entire off-screen VRAM 211D. To this end, a "death and resurrect" entry point ("D&R") is provided. Referring to FIG. 7, when the D&R is called, the routine associated with the entry point determines whether death or resurrection is desired. The routine begins in step 700 and proceeds to step 702. In step 702, the D&R call parameters are checked and, by analyzing a function code passed as an in parameter, a determination is made in step 704 whether the request is a "death" request or a "resurrect" request.

In the case of a death request, the routine, in step 706, allocates a buffer in RAM 106 of sufficient size to hold the contents of the entire off-screen VRAM 211D. Then, in step 710, the contents of the off-screen VRAM 211D are transferred to the newly-allocated buffer in RAM 106, and the routine finishes in step 712. The requesting software 205, now has complete access to the off-screen VRAM 211D. However, at this point, the software 205 may not use the routines discussed above that modify the VRAM and buffer allocation lists.

After the software 205 has finished using the off-screen VRAM 211D, it must resurrect the contents of the off-screen VRAM 211D with a call to the same entry point but having the function code indicate that a "resurrection" is desired. As previously mentioned, in steps 702 and 704, the call parameters are checked and it is determined that a resurrection operation is requested. The routine then transfers the contents from the buffer in system RAM 106 to the off-screen VRAM 211D in step 708 and finishes in step 712.

The foregoing description has been focused upon an illustrative embodiment, and certain variations, of the invention. Other variations and modifications, however, may be made to this embodiment, which will attain some or all of the advantages of the invention. It is, therefore, an object of the appended claims to cover all such variations and modifications that come within the true spirit and scope of the invention.

In an alternate embodiment, the invention may be implemented as a computer program product for use with a computer system. Such implementation may comprise a series of computer readable instructions either fixed on a tangible medium, such as a computer readable media, e.g. diskette 142, CD-ROM 147, ROM 115, or fixed disk 152 (FIG. 1), or transmittable to a computer system, via a modem or other interface device, such as network adapter 98 connected to network 96, over either a tangible medium, including but not limited to optical or analog communications lines, or intangibly using wireless techniques, including but not limited to microwave, infrared or other transmission techniques. The series of computer readable instructions embodies all or part of the functionality previously described herein with respect to the invention. Those skilled in the art will appreciate that such computer readable instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software; preloaded with a computer system, e.g., on system ROM or fixed disk, or distributed from a server or electronic bulletin board over a network, e.g., the Internet or World Wide Web.

What is claimed is:

1. Apparatus for allocating video memory in a computer system having a system memory and an off-screen VRAM in response to an allocation request from an application program to obtain use of a portion of the off-screen VRAM, the apparatus comprising:

means responsive to an allocation request made by an application program for storing said allocation request and for querying the off-screen VRAM to determine whether the off-screen VRAM has an unused part of sufficient size to satisfy the allocation request;

means cooperating with the determining means for allocating part of the off-screen VRAM to the application program when the unused part exists in response to either a current allocation request or a stored allocation request; and means cooperating with the determining means for allocating to the application program, a portion of the system memory having a sufficient size to accommodate the allocation request when the unused part does not exist.

2. The apparatus of claim 1 further comprising:

means for monitoring the off-screen VRAM to determine when a previously-allocated portion of the off-screen VRAM with a size becomes unused; and means for transferring information stored in the system memory portion to the previously-allocated portion of the off-screen VRAM when the previously-allocated portion size is large enough to accommodate the system memory portion size.

3. The apparatus of claim 2 wherein the monitoring means comprises means responsive to a deallocation request received from the application program for informing the monitoring means that video memory allocated to the application program is unused.

4. The apparatus of claim 2 wherein the monitoring means further comprises means responsive to the deallocation request for identifying the application program as a candidate for a transfer of information from the system memory to the off-screen VRAM when the application program has been allocated a portion of the system memory and the previously-allocated portion size of the off-screen VRAM is large enough to accommodate the system memory portion size.

5. The apparatus of claim 1 further comprising means responsive to an allocation request from the application program to use previously-allocated video memory for transferring information stored in the system memory portion to the previously allocated portion of off-screen VRAM.

6. The apparatus of claim 1 further comprising:

storage means responsive to an allocation request from the application program for storing the request;

means cooperating with the determining means for storing in the storage means an address of the part of the off-screen VRAM when the unused part exists; and means cooperating with the determining means for storing in the storage means an address of the portion of the system memory when the unused part does not exist.

7. The apparatus of claim 6 further comprising means responsive to an information request from the application program for returning to the application program the address stored in the storage means.

8. A method for allocating video memory in a computer system having a system memory and an off-screen VRAM in response to an allocation request from an application program to obtain use of a portion of the off-screen VRAM, the method comprising the steps of:

A. querying the off-screen VRAM to determine whether the off-screen VRAM has an unused part of sufficient size to satisfy the allocation request;

B. allocating part of the off-screen VRAM to the application program when the unused part of VRAM exists; and C. allocating to the application program, a portion of the system memory having a sufficient size to accommodate the allocation request when the unused part of VRAM does not exist.

9. The method of claim 8 further comprising the steps of:

D. monitoring the off-screen VRAM to determine when a previously-allocated portion of the off-screen VRAM with a size becomes unused; and E. transferring information stored in the system memory portion to the previously-allocated portion of the off-screen VRAM when the previously-allocated portion size is large enough to accommodate the system memory portion size.

10. The method of claim 9 wherein step D comprises the steps of:

D1. receiving a deallocation request from the application program; and

D2. informing the monitoring means that video memory allocated to the application program is unused when the deallocation request is received.

11. The method of claim 9 wherein step D further comprises the step of:

D3. identifying the application program as a candidate for a transfer of information from the system memory to the off-screen VRAM when the application program has been allocated a portion of the system memory and the previously-allocated portion size of the off-screen VRAM is large enough to accommodate the system memory portion size.

12. The method of claim 8 further comprising the step of:

F. receiving an information request from the application program to use previously-allocated video memory; and G. transferring information stored in the system memory portion to the previously-allocated portion of the off-screen VRAM in response to the information request.

13. The method of claim 8 further comprising the steps of:

H. storing the request in response to an allocation request from the application program;

I. storing an address of the part of the off-screen VRAM when the unused part of VRAM exists; and J. storing an address of the portion of the system memory when the unused part of VRAM does not exist

14. The method of claim 13 further comprising the step of:

K. returning to the application program the address stored in the storage means in response to an information request received from the application program.

15. Apparatus for allocating video memory buffer having a predetermined size in a computer system having a system memory and an off-screen VRAM in response to an allocation request from an application program to obtain use of the video memory buffer, the apparatus comprising:

storage means responsive to the allocation request for storing information relating to the allocation request including a size of the video memory buffer requested;

means for maintaining a list of all unused VRAM portions;

means responsive to the allocation request for checking the list to determine whether the off-screen VRAM has an unused portion of sufficient size to allocate to the application program;

means cooperating with the checking means, for storing a VRAM address of the unused portion in the storage means when the unused portion exists; and means cooperating with the checking means for storing in the storage means a system memory address of a portion of the system memory having a sufficient size to accommodate the video memory buffer when the unused portion does not exist.

16. The apparatus of claim 15 further comprising:

means responsive to a deallocation request received from the application program for monitoring the off-screen VRAM to determine when a previously-allocated portion of the off-screen VRAM with a size becomes unused;

means responsive to an information request from the application program to use the video memory buffer for checking the storage means to determine whether a previous allocation request was satisfied by allocating off-screen VRAM or by allocating system memory;

means for comparing the stored video memory buffer size to the previously-allocated off-screen VRAM portion size when the previous allocation request was satisfied by allocating system memory; and means for transferring information stored in the system memory portion to the previously-allocated portion of the off-screen VRAM when the previously-allocated portion size is large enough to accommodate the video memory buffer size.

17. The apparatus of claim 16 wherein the storage means comprises:

a data structure; and means for recording information in the data structure representative of the requests that were satisfied by allocating system memory; and wherein the transferring means comprises means for analyzing the data structure to determine whether the contents of a video memory buffer in system memory may be transferred to off-screen VRAM.

18. The apparatus of claim 17 wherein the checking means comprises means responsive to the allocation request for storing a buffer id in the storage means.

19. The apparatus of claim 18 wherein the monitoring means comprises means responsive to the deallocation request for traversing the data structure in order to mark the data structure to indicate candidate allocations, which were satisfied by allocating system memory and have sizes no greater than the previously-allocated portion of the off-screen VRAM which became unused.

20. The apparatus of claim 19 wherein the transferring means comprises means responsive to the information request to use the video memory buffer for checking the data structure to determine whether the corresponding stored information indicates that the video memory buffer is a candidate allocation.

21. A computer program product comprising:

a computer usable medium having computer readable program code means embodied thereon for allocating the video memory in a computer system having a system memory and an off-screen VRAM, in response to an allocation request from an application program to obtain use of a portion of the off-screen VRAM, said computer readable program code means comprising:

program code means for querying the off-screen VRAM to determine whether the off-screen VRAM has an unused part of sufficient size to satisfy the allocation request;

program code means for allocating part of the off-screen VRAM to the application program when the unused part of VRAM exists; and program code means for allocating to the application program, a portion of the system memory having a sufficient size to accommodate the allocation request when the unused part of VRAM does not exist.

22. The computer program product of claim 21 further comprising:

program code means for monitoring the off-screen VRAM to determine when a previously-allocated portion of the off-screen VRAM with a size becomes unused; and program code means for transferring information stored in the system memory portion to the previously-allocated portion of the off-screen VRAM when the previously-allocated portion size is large enough to accommodate the system memory portion size.

23. The computer program product of claim 22 wherein said program code means for monitoring off-screen VRAM further comprises:

program code means for receiving a deallocation request from the application program; and program code means for informing the monitoring means that video memory allocated to the application program is unused when the deallocation request is received.

24. The computer program product of claim 22 wherein said program code means for monitoring off-screen VRAM further comprises:

program code means for identifying the application program as a candidate for a transfer of information from the system memory to the off-screen VRAM when the application program has been allocated a portion of the system memory and the previously-allocated portion size of the off-screen VRAM is large enough to accommodate the system memory portion size.

25. The computer program product of claim 21 further comprising:

program code means for receiving an information request from the application program to use previously-allocated video memory; and program code means for transferring information stored in the system memory portion to the previously-allocated portion of the off-screen VRAM in response to the information request.

26. The computer program product of of claim 21 further comprising:

program code means for storing the request in response to an allocation request from the application program;

program code means for storing an address of the part of the off-screen VRAM when the unused part of VRAM exists; and program code means for storing an address of the portion of the system memory when the unused part of VRAM does not exist.

27. The computer program product of claim 21 in combination with documentation.

28. A computer program product for use in a computer system having a system memory and an off-screen VRAM, the computer program product comprising:

a computer usable medium having computer readable program code means embodied in said medium for allocating video memory in response to an allocation request from an application program to obtain use of a portion of the off-screen VRAM, the computer readable program code means comprising:

first computer program code means for causing the computer system to query the off-screen VRAM to determine whether the off-screen VRAM has an unused portion of sufficient size to satisfy the allocation request;

second computer program code means for causing the computer system to allocate a portion of the off-screen VRAM to the application program when the unused off-screen VRAM portion exists; and third computer program code means for causing the computer system to allocate a portion of the system memory to the application program when the unused off-screen VRAM portion does not exist, the system memory having a sufficient size to accommodate the allocation request.

29. The computer program product as defined in claim 28 wherein the program code means further comprises:

fourth computer program code means for causing the computer system to monitor the off-screen VRAM to determine when a previously-allocated portion of the off-screen VRAM becomes unused, the previously-allocated portion of off-screen VRAM having a size; and fifth computer program code means for causing the computer system to transfer information stored in the system memory portion to the previously-allocated portion of the off-screen VRAM when the previously-allocated portion size is large enough to accommodate the system memory portion size.

30. The computer program product as defined by claim 29 wherein the program code means further comprises:

sixth computer program code means for causing the computer system to receive a deallocation request from the application program; and seventh computer program code means for causing the computer system to inform the monitoring means that video memory allocated to the application program is unused when the deallocation request is received.

* * * * *